No. 664,308. Patented Dec. 18, 1900.
T. B. ZELLER.
ELECTROTHERAPEUTIC SPECTACLES.
(Application filed Oct. 29, 1900.)

(No Model.)

Witnesses

T. B. Zeller, Inventor
Attorneys

UNITED STATES PATENT OFFICE.

THOMAS B. ZELLER, OF PITTSBURG, PENNSYLVANIA, ASSIGNOR OF ONE-HALF TO FRANKLIN P. SAYLOR, OF SAME PLACE.

ELECTROTHERAPEUTIC SPECTACLES.

SPECIFICATION forming part of Letters Patent No. 664,308, dated December 18, 1900.

Application filed October 29, 1900. Serial No. 34,826. (No model.)

*To all whom it may concern:*

Be it known that I, THOMAS B. ZELLER, a citizen of the United States, residing at Pittsburg, in the county of Allegheny and State of Pennsylvania, have invented new and useful Electrotherapeutic Spectacles, of which the following is a specification.

This invention relates to electrotherapeutic spectacles; and the object of the same is to provide a simple and compact form of spectacles embodying electrical positive and negative elements at points distant from each other to set up a light stimulating current of electricity, which is conveyed, through the aural nerves and those located adjacent to the location of the bridge on the nose, to the optic nerve, and thereby greatly benefit the wearer of the spectacles by gradually imparting strength to the said latter nerve and without inconveniencing the wearer in the least or changing the general contour of spectacles as now formed and embodying temples having terminal bows to fit over the ears.

The invention consists in the construction and arrangement of the several parts, which will be more fully hereinafter described and claimed.

Figure 1:
Figure 2:
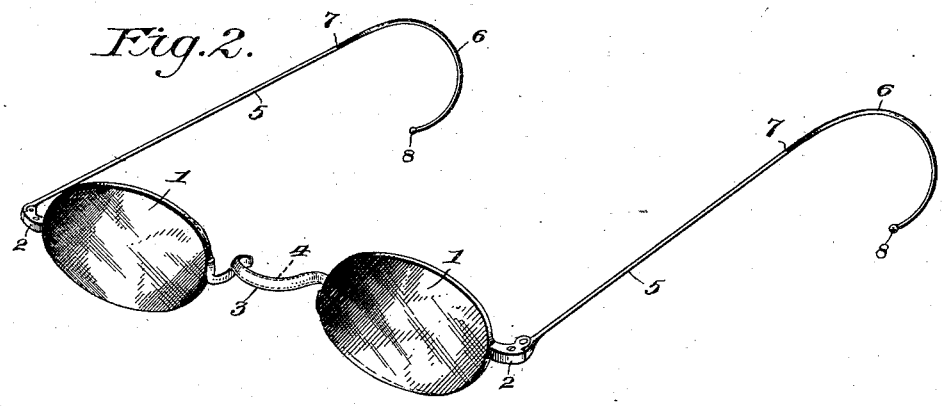

In the drawings, Figure 1 is a perspective view of a human head and a part of the body, showing the improved spectacles applied and the usual contact of the temple-bow behind the ear. Fig. 2 is an enlarged perspective view of the improved spectacles.

Similar numerals of reference are employed to indicate corresponding parts in the views.

The numeral 1 designates the usual lens-frames, 2 the temple-connecting end pieces, and 3 the bridge, all of the usual external appearance and construction, the bridge 3 in the present instance having a filling or a piece of copper 4 inclosed therein, as shown by dotted lines in Fig. 2, and which is the negative element in the present instance. The temples 5 are also of the usual skeleton form and movably attached to the end pieces 2, the rear terminal bow portions 6 being formed of suitably-hardened zinc from the point 7 to the terminal knobs 8 thereof. The zinc bows form the positive element of the present electrical combination, and the electrolyte is provided by the perspiration or acidulous exudation from the nose on which the bridge bears and the portion of the head immediately behind the ears. When the electrical action is set up, the zinc becomes the negative pole and the copper in the bridge the positive pole of the battery that is thus produced, and it will be observed that the bows 6 are continually held in contact with the bare skin behind the ears of the wearer and the bridge likewise continually held in contact with the skin of the nose, and a steady current will thus be established of a mild nature. The current generated in the manner set forth is conveyed, through the aural nerves and those located adjacent the position of the bridge on the nose, to the optic nerve, with a stimulating and strengthening effect and without passing through any part of the head, with great benefit to the wearer.

The improved spectacle structure will relieve the eyes of tired sensations or weaknesses and permit them to be used for a greater length of time under strain without injury than can be done under the ordinary spectacle structure. By the improved construction also the spectacle structure is not impaired or rendered unsightly and inconvenient by cumbersome attachments and the cost of manufacture is not increased.

Though zinc and copper have been referred to as the preferred battery elements, it will be understood that it is proposed to use other metals having a similar electrical relation.

Having thus described the invention, what is claimed as new is—

1. As an improved article of manufacture electrotherapeutic spectacles having a bridge with an electric negative element therein and temples with terminal bows formed of an electrical positive element, the said elements being fully within the confines of the parts set forth and without increasing the dimensions of the same.

2. As an improved article of manufacture electrotherapeutic spectacles having a bridge with copper inclosed therein and temples with zinc bows regularly continuing therefrom and forming the terminals thereof.

In testimony that I claim the foregoing as my own I have hereto affixed my signature in the presence of two witnesses.

THOMAS B. ZELLER.

Witnesses:
FRANKLIN P. SAYLOR,
W. W. WYANT.